United States Patent [19]
Katoh et al.

[11] 3,965,483
[45] June 22, 1976

[54] TAPE RECORDING APPARATUS FOR EDITING RECORDING

[75] Inventors: Hiroshi Katoh, Yokohama; Mitsuo Fujita, Tokyo, both of Japan

[73] Assignee: Victor Company of Japan, Limited, Yokohama, Japan

[22] Filed: Apr. 15, 1975

[21] Appl. No.: 568,255

[30] Foreign Application Priority Data
Apr. 15, 1974 Japan.............................. 49-40892
Feb. 21, 1975 Japan.............................. 50-20830
Feb. 21, 1975 Japan.............................. 50-20831
Feb. 21, 1975 Japan.............................. 50-20832

[52] U.S. Cl.................................. 360/14; 360/72; 360/74; 360/90
[51] Int. Cl.² ................. G11B 27/02; G11B 15/20; H04N 5/78
[58] Field of Search ................. 360/13, 14, 71, 72, 360/74, 84, 90; 226/118

[56] References Cited
UNITED STATES PATENTS
3,053,427 9/1962 Wasserman........................ 226/118
3,459,901 8/1969 Cooper................................ 360/13
3,682,363 8/1972 Hull..................................... 360/13

Primary Examiner—Raymond F. Cardillo, Jr.

[57] ABSTRACT

A tape recording apparatus comprises a first mechanism capable of varying, between a maximum and a minimum length, a tape travel path extending between a recording and reproducing head and a tape take-up roll. A second mechanism controls the first mechanism so that the length of the tape travel path becomes the maximum length at the time of ordinary recording and at the time of editing. The length of the tape travel path becomes the minimum length at the time of a pause mode prior to the editing recording. A third mechanism pulls back the tape by a length equal to the difference between the maximum and minimum lengths, at the time of the pause mode, of the tape path between the tape roll on the tape supply side and the recording and reproducing head. A fourth mechanism detects when the first mechanism reaches substantially maximum tape length at the time of the editing recording mode, and causes the start of editing recording by the recording and reproducing head.

8 Claims, 8 Drawing Figures

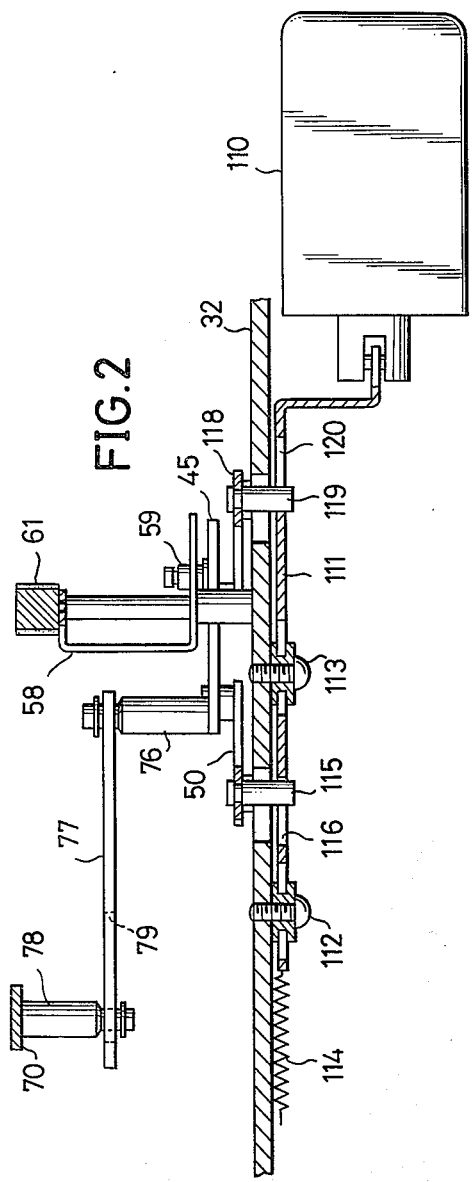
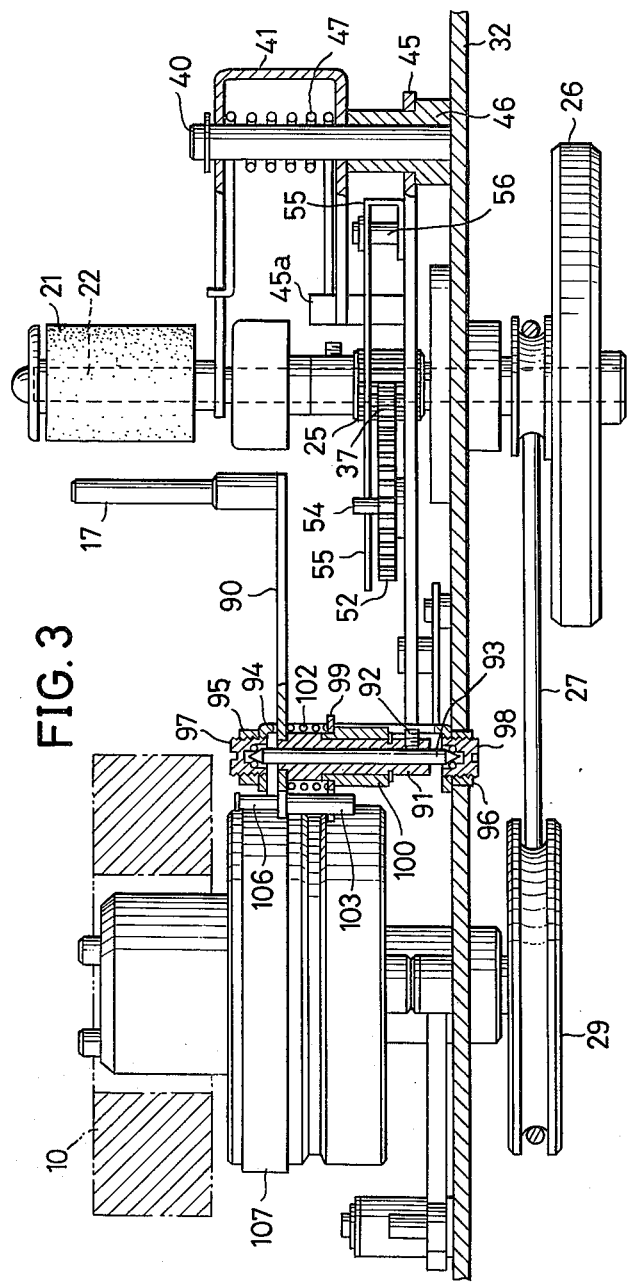

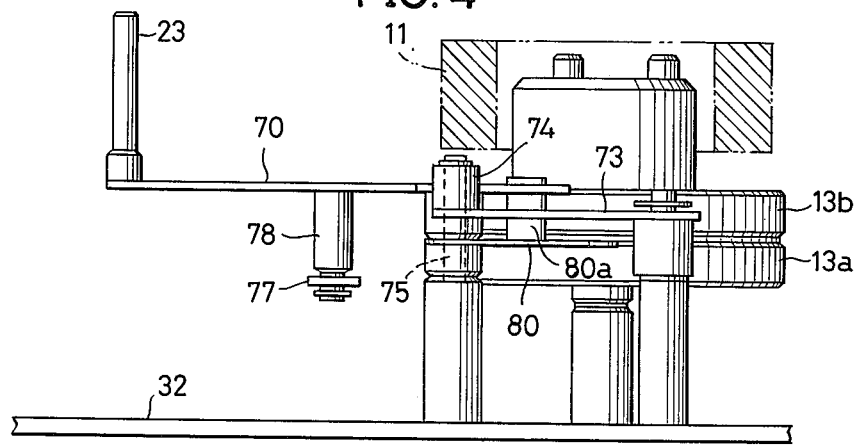
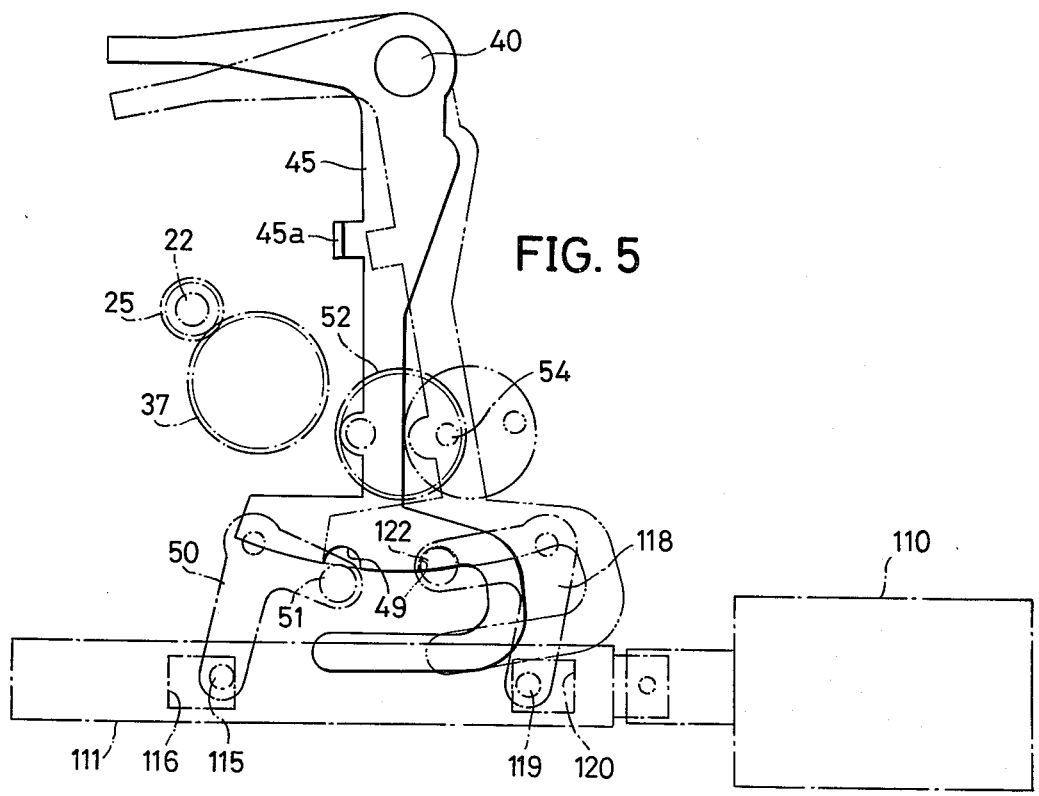

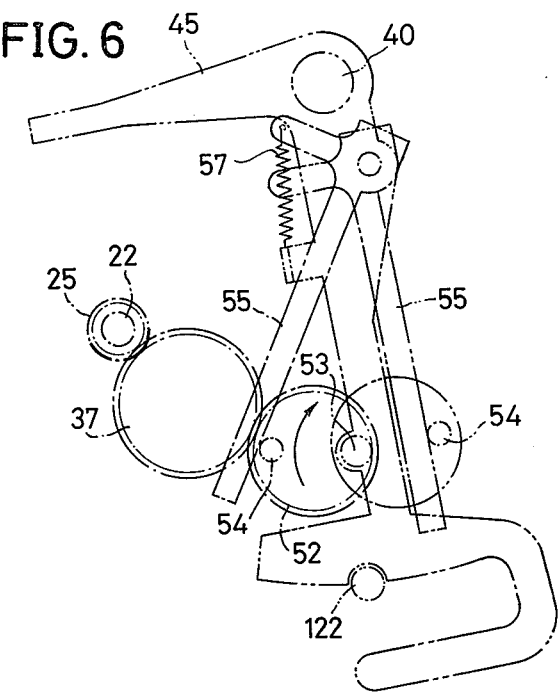
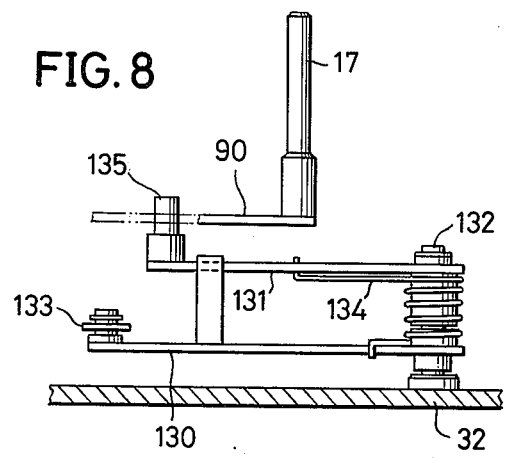

TAPE RECORDING APPARATUS FOR EDITING RECORDING

BACKGROUND OF THE INVENTION

This invention relates generally to apparatuses for recording on tape recording media, and more particularly to a recording apparatus capable of editing recording.

More specifically, the invention relates to an apparatus for recording on a tape (hereinafter referred to as a "tape") and for carrying out editing recording. When the recording of a video signal is stopped, a take-up tape loop is constructed to cause the tape to move along a tape path to the tape supply side. Then, when a control manipulation causes a resumption of recording, a specific take-up side tape loop is formed, and, with parts such as a capstan servo in a locked state, a new video signal is recorded in an edited change of the already recorded signal.

At present, there are a number of apparatuses of a type wherein a plurality of different video signals are successively recorded (so-called editing recording). Normal pictures can then be reproduced in continuous succession. In an apparatus of this type, a video signal recorded on a magnetic tape is reproduced as it is controlled by a control signal recorded together therewith. For this reason, at the time of recording, it is necessary that the control signal is recorded uniformly as it is recorded at the time of ordinary recording, even at points of change in the program content. In order to satisfy this required condition, the recording and reproducing apparatus incorporates either one of the two kinds of known mechanisms described below.

In the first known mechanism, the apparatus is temporarily changed to the rewinding mode as a result of a stop control manipulation. The quantity of rewinding tape is controlled by a rotating member in contact with the tape at an intermediate part of a tape loop. In a recording and reproducing apparatus in which this mechanism is applied, a complicated mechanism is necessary for causing the reel disc driving mechanism systems on the tape supply side and the tape take-up side to be disengaged responsive to a stopping manipulation and thereafter to be set into a reverse rotation mode. Moreover, if this driving mechanism changing operation is carried out within a short time, an excessive load is imparted to the driving mechanisms, which are thereby damaged.

In the second known mechanism, an arm having a guide pin is provided at the tape outlet on the tape supply side. The arm is rotated by means (such as a motor) at the time of stopping. A tape loop is pushed and expanded by the guide pin, thereby to pull back the tape by a specific quantity along a tape path, in the reverse direction. In this mechanism, the tape thus pulled back is the tape being taken up on the tape take-up roll. The tape take-up roll is rotated, at the time of the pulling back of the tape, with the roll turning in the direction opposite to that in which it turns at the time of recording or reproducing.

For this reason, the quantity of the pulled back tape is not always constant. It is influenced by factors such as the inertia of the tape roll. Therefore, the juncture of different programs cannot always be obtained as a constant relationship. As a result, when this tape is reproduced, a noise or disturbance of the reproduced picture occurs at the point of a change of program.

SUMMARY OF THE INVENTION

It is a general object of the present invention to provide a novel and useful tape recording apparatus in which the above described difficulties have been overcome.

Another and specific object of the invention is to provide a tape recording apparatus which is capable of editing and which has means whereby the tape which has been moved to the tape supply side, at the time of stopping, is accumulated as a new tape loop.

Still another object of the invention is to provide a tape recording apparatus in which there is a formation of a predetermined tape loop on the take-up side as a result of control manipulation for resumption of recording. The loop is detected by means of a microswitch for detecting the movement of an arm.

A further object of the invention is to provide a recording apparatus which is capable of accomplishing editing recording, and in which the moving of the tape to the supply side, at the time of stopping, is carried out by a mechanism for detecting the tape tension on the supply side.

A still further object of the invention is to provide a recording apparatus which is capable of accomplishing editing. Here an object is to avoid contraction of the tape loop on the take-up side, which might otherwise accompany the stopping of recording operation. The formation of the tape loop on the take-up side, accompanying the resumption of recording operation, are carried out stably and not in an excessively abrupt manner.

Other objects and further features of the invention will be apparent from the following detailed description with respect to preferred embodiment of the invention whem read in conjunction with the accompanying drawings.

BRIEF DESCRIPTION OF THE DRAWING

In the drawings:

FIG. 2 is a vertical section taken along the line II—II in FIG. 1, as viewed in the arrow direction;

FIG. 3 is a vertical section taken along the line III-—III in FIG. 1, as viewed in the arrow direction;

FIG. 4 is a side view, partly in vertical section, taken along the line IV—IV in FIG. 1, as viewed in the arrow direction;

FIG. 5 is a plan view showing the rotational displacement of a swing arm at the time of pause mode, in the recording apparatus illustrated in FIG. 1;

FIG. 6 is a plan view showing the rotational state of an eccentric gear at the time of pause mode, in the recording apparatus illustrated in FIG. 1;

FIG. 8 is a side view taken along the line VIII—VIII in FIG. 7, as viewed in the arrow direction.

DETAILED DESCRIPTION

Figure 1:
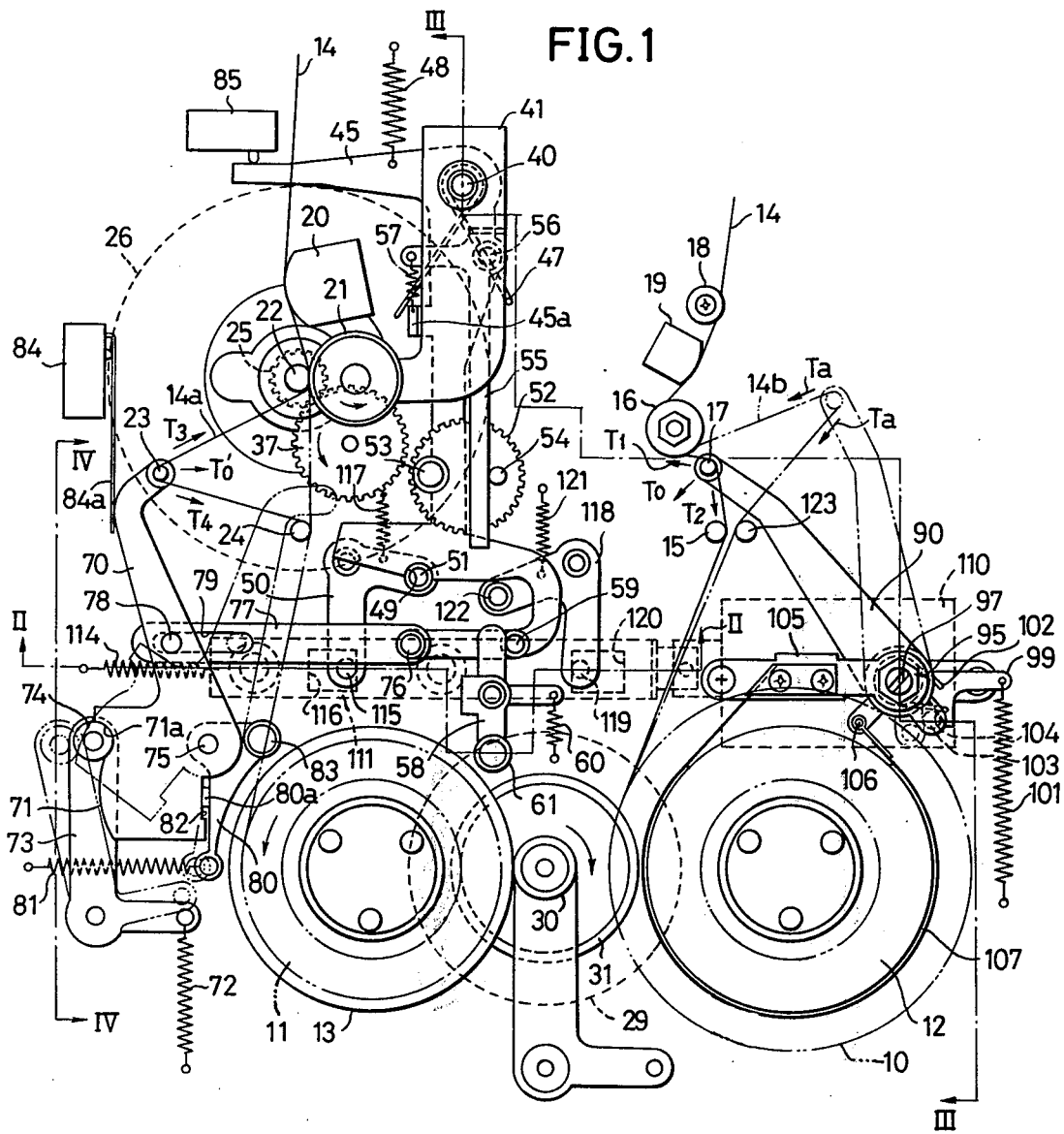
FIG. 1 is a plan view showing one embodiment of the tape recording and reproducing apparatus capable of accomplishing editing recording according to the present invention with the sub-chassis removed.

Referring now to FIG. 1, an apparatus according to the present invention is shown in a recording state, a magnetic tape 14 is drawn from a supply side tape roll 10, which is in a form of a reel mounted on a reel disc 12. The tape passes along the aftermentioned tape path and reaches a take-up side tape roll 11, which is formed in a reel mounted on a reel disc 13.

The magnetic tape 14 is drawn from the tape supply roll 10. Its tape tension is controlled at a constant value, as described hereinafter, by a tension pole 17, with the tape in contact between a guide pin 15 and a rotatable guide pole 16. The tape 14 then contacts a full-width erasing head 19 located between rotatable guide poles 16 and 18. Erasure is carried out over the full width of the tape. Thereafter, the tape is wrapped around the peripheral surface of a guide drum (not shown) over a specific angular range, where video signals are recorded thereon by rotating video heads (not shown).

The tape 14 which has contacted the guide drum passes by an audio-control head 20, where audio signals and control signals are recorded. The tape 14 is then clamped between and driven by a pinch roller 21 and a capstan 22, and forms a triangular tape loop 14a guided by the capstan 22, a guide pole 23, and a guide pin 24. Thereafter, the tape reaches the tape roll 11.

The mode of the recording apparatus is controlled by micro-switches 84 and 85 which are connected in series to an electric circuit system (not shown). The electric circuit system assumes the recording mode when both of the micro-switches 84 and 85 are closed. It is switched to the reproducing mode when either one or both are opened. In FIG. 1, the actuators of the micro-switches 84 and 85 are shown as being pushed, respectively, by a swing arm 45 and a loop arm 70, whereby these micro-switches are closed. The apparatus is thereby switched into the recording mode.

Furthermore, in this recording mode, the capstan 22 rotates in synchronism with the commercial power source frequency, and therefore at a specific speed. The rotary video recording heads rotate in synchronism with synchronizing signals of the incoming video signals. The rotation of the video heads is controlled, in other modes, as in the case of the recording mode.

At this time, the capstan 22 and a driving gear 25 rotate unitarily with a fly-wheel 26 driven by a motor (not shown), at a specific speed in the clockwise direction. Moreover, the rotation of the fly-wheel 26 is transmitted through a belt 27 to a pulley 29, as shown in FIG. 3. The pulley 29 rotates in the clockwise direction unitarily with a driving roller 30 and a rewinding roller 31. The rotation of the driving roller 30 is transmitted to a lower disc 13a (as shown in FIG. 4) with the driving roller 30 pressed thereagainst. Further, rotational power is transmitted by way of a friction clutch to an upper disc 13b of the take-up side reel disc 13, whereby the upper disc 13b is rotated in a take-up direction.

The pinch roller 21 (FIG. 3) is rotatably mounted on an outer end of a pinch roller arm 41 which, in turn, is rotatably supported on a stud 40 fixed to a chassis 32. Moreover, the swing arm 45 is pivoted on the stud 40 over a bushing 46. The arms 41 and 45 are, respectively, urged to turn in the clockwise and counterclockwise directions by a torsion spring 47 provided around the stud 40.

In the aforementioned recording mode, the swing arm 45 (FIG. 1) is urged to rotate in the clockwise direction by a spring 48. Arm 45 is limited in this rotation by a locking roller 51, provided on a locking arm 50 fitting into a recess 49. In this state, the bent part 45a of the swing arm 45 is separated from the pinch roller arm 41. Accordingly, the arm 41 is biased by the spring 47 and is placed at a position, to which it has rotated in the clockwise direction. At this time the pinch roller 21 is being pressed against the capstan 22, with the magnetic tape 14 interposed therebetween.

An eccentric gear 52 is pivoted on a shaft 53 fixed to the swing arm 45 and is restrained in rotation by being engaged by a pin 54 provided on the long radius part of the eccentric gear, with a rotatable arm 55 at a position indicated in FIG. 1. The short radius part gear 52 confronts and is separated from an idle gear 37 which is meshed with the driving gear 25, to be rotated in the counterclockwise direction. The arm 55 is pivoted on a shaft 56 fixed to the arm 45. Arm 55 is urged to turn in the counterclockwise direction in FIG. 1 by a spring 57 stretched between an arm part thereof and the bent part 45a.

Furthermore, at this time, a brake arm 58 engages a pin 59 fixed to the arm 45. Brake arm 58 is turned in the counterclockwise direction against the force of a spring 60 to separate a brake shoe 61 from the upper disc 13b of the take-up reel disc 13.

The loop arm 70 is pressed at its arcuate cam 71 by a roller 74 provided on a pressure arm 73. A torque in the clockwise direction is exerted upon arm 75 by a spring 72, which urges it to turn in the counterclockwise direction, about a shaft 75. In the aforementioned recording mode, a control plate 77, connected to the arm 45 by a pin 76, is displaced toward the left as indicated in FIG. 1. Therefore, the arm 70 is turned by the action of the arm 73 in the counterclockwise direction, counter to the force of a spring 81. It is limited in thus turning by an engagement of the roller 74 with a recess 71a formed at an extremity of the arcuate cam 71. Accordingly, the aforementioned tape loop 14a is formed by the guide pole 23 fixed to the loop arm 70, at a distant part thereof.

At the time when the tape is traveling, tape tension T3 and T4 is imparted in the direction shown by the arrows in a tape part forming the tape loop 14a. The arm 70 receives a torque in the clockwise direction by a force To' acting on the guide pole 23 in the direction indicated by the arrow. The arm 70 is, however, limited in thus turning, as described hereinbefore, at the position indicated in FIG. 1. The guide pole 23 thereby guides the tape in a stable manner at the position indicated in FIG. 1, without being caused to move.

A brake arm 80 is urged to turn in the clockwise direction by a spring 81. However the turning of arm 80 is limited at its bent part 80a by an engagement with the surface 82 of the arm 70, whereby a brake shoe 83 is separated from the upper disc 13b of the take-up reel disc 13.

When the tape-supply side is considered, a tension arm 90 is provided with the tension pole 17 fixed thereto at an extremity thereof. Arm 90 is affixed by a set screw 92 to one end of a rod 93 extending through a bushing 91 as indicated in FIG. 3. The rod 93 is rotatably supported in a vertical position, the upper and lower ends thereof being journaled in pivot bearings 97 and 98, which are respectively fixed to a frame 94 by nuts 95 and 96. An arm 99 is rotatably fitted on the bushing 91 extending through a bushing 100, in a state of restricted axial movement. Arm 99 is urged to turn in the clockwise direction, by a spring 101. Furthermore, the tension arm 90 is caught by one arm of a torsion spring 102, the other end of which is engaged by the arm 99 and is thereby urged to turn in the clockwise direction.

Similarly, at the time when the tape is traveling, the tension arm 90 is urged to turn in the counterclockwise direction by a force To acting on the tension pole 17. The tape tension T1 and T2 causes arm 90 to move in the arrow direction (FIG. 1). The above described torque in the clockwise direction, due to the torsion spring 102, is predetermined so that it is less than the torque in the counterclockwise direction due to the force To.

Accordingly, while the tape is traveling, the tension arm 90 turns in the counterclockwise direction responsive to the force To acting on the tension pole 17 counter to the force of the torsion spring 102. Further a pin 103 fixed to the lower part of arm 90 pushes an engagement surface of the arm 99, thereby causing the arm 99 to turn in the counterclockwise direction, against the force of the spring 101. A brake band 107 is connected at its ends to a frame 105 and to a pin 106 fixed to the arm 99. The brake band encircles an upper disc of the supply reel disc 12. The brake band changes its tension in accordance with the rotational position of the arm 99, so that the back tension on the magnetic tape 14 paid out from the tape roll 10 is controlled, at a constant value.

The tension servo mechanism refered to above is so organized that, in accordance with the rotation of the tension arm 90 up to a specific position, the brake band 107 changes its tension to control the tape tension. The tension arm 90 is capable of turning further in the clockwise direction from the above described specific position independently of the tension control mechanism, such as the arm 99 and other parts.

Furthermore, in the recording mode, a plunger 110, as shown in FIG. 2, is in an actuated state. A slide plate 111 is thereby displaced toward the right. The slots on plate 111 are guided by guide members 112 and 113 consisting of collars, washers, and other parts. The plate displacement is counter to the force of a spring 114, with movement to a position as indicated in FIGS. 1 and 2. In this state, a lock arm 50 is released from engagement by a pin 115 with respect to a rectangular hole 116. Arm 50 is turned in the counterclockwise direction by a spring 117, whereby the lock roller 51 fits in the recessed part 49 of the arm 45 as described hereinbefore. Another lock arm 118 is engaged at its pin 119 by a rectangular hole 120, to be turned in the counterclockwise direction counter to the force of a spring 121.

Next, the control manipulation and operation of editing recording in the apparatus of the invention will be described, beginning with an outline summary thereof. In the normal recording mode, the manipulation of a push-push type pause mode button (not shown) causes the apparatus to change the mechanical system thereof into the pause mode state and the electrical circuit system thereof into the reproducing state. Furthermore, the take-up tape loop 14a is contracted, thereby moving the tape 14 along the tape running path to the tape supply side.

When the editing is to be started, the pause button is pushed again. This manipulation causes the pause button to be released, and the tape 14 begins to travel in its normal direction. At the time when the above mentioned tape loop 14a is approximately formed, the electrical circuit system of the apparatus is placed in the recording mode, whereby the recording anew of video signals starts, superseding the prerecorded part on the tape.

The control manipulation and operation referred to above will now be described in detail. First, during the normal recording mode, the pause mode manipulation is carried out, as described hereinbefore. This manipulation causes the plunger 110 to be in its unoperated state, whereby the sliding plate 111 is moved by the spring 114 to the left in FIGS. 1 and 2. This movement of the sliding plate 111 causes the lock arm 50 to turn in the clockwise direction, thereby disengaging the lock roller 51 from the recess 49. The lock arm 118 is released since the pin 119 is released by the rectangular hole 120. The lock arm is thereby turned in the clockwise direction responsive to the spring 121, whereby the lock roller 122 contacts the swing arm 45.

As the lock roller 51 separates from the recess 49, the swing arm 45 is rotated by the tension force of the spring 48 in the clockwise direction, counter to the force of the torsion spring 47. This causes the eccentric gear 52 to mesh, at the short radius thereof, with the idle gear 37 and thereby to be driven in rotation, in the clockwise direction. As the radius of the meshing part of the eccentric gear 52 increases, in accordance with the rotation thereof, the arm 45 is turned in the counterclockwise direction against the force of the spring 48.

As the swing arm 45 turns in the counterclockwise direction, the switch 85 is opened, at first, by releasing the pushing force against the actuator thereof. The electrical circuit system of the apparatus is changed from the recording mode to the reproducing mode. The recording operation by the rotary video heads (not shown) provided in the guide drum and the control head 20, is interrupted. At the same time the brake arm 58 is released from engagement by the pin 59, to be turned in the clockwise direction by the spring 60, whereby the brake shoe 61 pushes against the upper disc 13b of the reel disc 13. Accordingly, the take-up reel disc 13 assumes a state wherein the rotation of the upper disc 13b is stopped by the action of the brake shoe 61. The lower disc 13a continues to be driven by the driving roller 30, whereby the tape winding operation by the tape roll 11 stops.

The time required to completely stop the rotation of the upper disc 13b after the time when the switch 85 is opened, is determined by the inertia force of the rotary mechanism which in turn is determined by the upper disc 13b, the tape roll 11, etc., the braking force imparted by the brake shoe 61, the characteristics of the friction clutch incorporated in the take-up reel disc 13, and by other factors. The brake force and the clutch characteristics are always substantially constant. The inertia force is also substantially the same when the tape is being wound around the tape roll from the start to the end, when the weight and the rotating speed of the tape roll 11 is considered. On the other hand, since the braking force of the brake shoe 61 is set at a relatively large value, the rotation of the tape roll 11 fully stops with almost no deviation in an extremely short time after the switch 85 has opened.

If the swing arm 45 turns more in the counterclockwise direction, the pinch roller 21 is engaged by the bent part 45a and caused to turn in the counterclockwise direction unitarily with the arm 45. The pinch roller 21 separates from the capstan 22, thereby stopping the travel of the magnetic tape 14. When the tape stops traveling, the tape tension thereof is reduced. The spring 101 causes arm 99 to be rotated slightly in the clockwise direction, together with the tension arm 90. Accordingly, the brake band 107 is tightened to impart braking force to the supply reel disc 12, thereby stopping the rotation thereof in the tape paying-out direction.

As is apparent from the above description, the interruption of the recording operation is carried out in a state wherein the tape 14 is still being driven by the pinch roller 21 and the capstan 22 at the specific speed. Hence, the normal recording operation is carried out until interruption occurs.

Furthermore, at the time when the travel of the tape 14 stops, the arm 70 starts to turn in the clockwise direction. The pin 78 is engaged by the left distant part of the slot 79 of the control plate moving toward the right, and against counterclockwise torque imparted by the roller 74 pushing the arcuate cam 71. Moreover, the micro-switch 84 is opened, its actuator 84a being released. The arm 70 is turned about the shaft 53 at a specific speed, not at an excessively high speed, interrelatedly with the rotation of the eccentric gear 52 driven by the driving gear 25 by way of the idle gear 37.

As another result of the turning of the loop arm 70 in the clockwise direction, the guide pole 23 moves toward the right in FIG. 1, whereby the tape loop 14a contracts gradually. As the tape loop 14a contracts, the tension of the tape 14 in the specific tape path decreases, thereby decreasing the force To acting on the tension pole 17. In this embodiment of the invention, a rotating drum is adopted as the guide drum (not shown). The frictional resistance force applied to the tape 14 extending from the guide pin 15 to the guide pin 24 by respective guide members is made amply small. Therefore, in accordance with the decrease in the force acting on the tension pole 17, the tension arm 90 is turned in the clockwise direction by the force of the torsion spring 102. At this time, the tension arm 90 is turned without being restricted in rotation, independently of the arm 99 which is limited in rotation.

Interrelatedly with the above mentioned turning of the tension arm 90, a triangular tape loop 14b is gradually formed by being engaged with the tension pole 17. While the tape loop 14b is being formed, a length of the tape, which corresponds to that by which the tape loop 14a was contracted, is caused to travel in the direction which is opposite to the direction that the tape follows during recording while contacting the control head 20, the guide drum (not shown), and the erasing head 19, in accordance with the above described turning of the arm 70 in the clockwise direction.

When the arm 70 turns in the clockwise direction, up to a position indicated by two-dot chain line in FIG. 1, the tape loop 14a is completely contracted. The tape 14 follows a path, guided by the capstan 22 and the guide pin 24, indicated by two-dot chain line. Accordingly, a length of the tape, corresponding to that of the tape loop 14a, is pulled pulled back. This tape is being engaged by the pole 17 of the tension arm 90, which has turned to the position indicated by a two-dot chain line. As the tape is pulled back along the tape path, the tape part contacting the control head 20, the guide drum (not shown), and the erasing head 19 forms the supply side tape loop 14b, guided by the guide pole 16, the tension pole 17, and a guide pin 123. The tape pulling back operation is carried out along the tape path formed in the recording mode and while both reel discs are stopped. The tape length pulled back is accurate and always kept constant, without deviation, at the time of the editing recording operations.

In the above described turning position, the torsion spring 102 urges the tension arm 90 to turn in the clockwise direction. The supply tape loop 14b is thereby pulled with an application of the relatively small tape tension Ta and Ta, in the arrow direction. Accordingly, the tape 14 is still held in contact with the rotating video heads (not shown) by a predetermined and relatively weak force, thereby preventing dust from adhering to the head chips of the video heads (not shown).

When the take-up side tape loop 14a contracts and disappears, and the supply side tape loop 14b is newly formed, the eccentric gear 52 reaches the rotational position where its long radius part comes into enmeshment with the idle gear 37, as indicated by one-dot chain line in FIG. 6. At this moment, the swing arm 45 is at a position where it has turned to the limit of its rotation in the counterclockwise direction, i.e., the position indicated by two-dot chain line in FIGS. 5 and 6. In this position, arm 45 is locked by the engagement of the lock roller 122 in the recess 49. Moreover, at this moment, the arm 55 is engaged with the pin 45 and turned to the position indicated by a one-dot chain line in FIG. 6, with turning against the force of the spring 57.

When the eccentric gear 52 is rotated further by the idle gear 37 and released from enmeshment therewith, the eccentric gear 52 is rotated quickly in the clockwise direction by the engagement between the pin 54 and the rotatable arm 55. Eccentric gear 52 is limited in this rotation at a position where the short radius part thereof confronts the idle gear 35, as indicated by two-dot chain line in the same figure.

In the above described condition, the recording apparatus of the present invention assumes an editing recording standby state. The tape 14 has moved to the supply side. A pause state is established in which the tape travel is interrupted with the pinch roller 21 separated from the capstan 22, while it continues to rotate. In this condition, the capstan 22 is rotated at a specific speed. The rotary video heads (not shown) are rotated, being controlled by the incoming video signals, while the electrical circuit system of the apparatus is held in the reproducing mode. The pause button (not shown) is manipulated to start the editing and recording of the new program signals, on the magnetic tape 14. This maipulation causes the pause button to return and actuate plunger 110. The slide plate 111 is thereby shifted toward the right in FIGS. 1 and 2, against the force of the spring 114. As a result of the shifting of the slide plate 111, the lock arm 118, turns in the counterclockwise direction, whereby the swing arm 45 is released from its lock state due to the lock roller 122. Accordingly, the swing arm 45 is quickly turned in the clockwise direction, together with the pinch roller arm 41 by the spring 48 and is finally limited of its turning at a position as indicated in FIGS. 1 and 6 by being engaged at its recessed part 49 by the lock roller 51. In this condition, the eccentric gear 52 assumes a state wherein the short radius part thereof confronts and separates from the idle gear 37. Furthermore, the pinch roller 21 is pressed against the capstan 22 by the torsion spring 47, whereby the magnetic tape 14 is clamped and driven.

As another result of the turning of the swing arm 45, the control plate 77 is displaced toward the left. The arm 70 is released from its engagement with the pin 78. Accordingly, the arm 70 is pressed at its arcuate cam 71 by the roller 74, and is turned gradually in the counterclockwise direction, as will be described hereinafter.

When the arm 45 is turned in the clockwise direction, up to the above described lock position, the microswitch 85 is closed. Its actuator is pushed by the one arm 45. However, the micro-switch 84 is kept opened at this time, and the electrical system is held in the reproducing mode. Furthermore, when the microswitch 85 is closed, the tape 14 has already been started in its travel by the pinch roller 21 and the capstan 22. The capstan servo becomes locked in a short period of time.

As another result of the turning of the arm 45 to the above described lock position, the arm 58 is turned in the counterclockwise direction to separate the brake shoe 61 from the take-up reel disc 13. At this time, however, the take-up reel disc 13 is braked by the brake shoe 83 pressed thereagainst, whereby the tape roll 11 is held in a stopped state.

Accordingly, the tape 14 is paid out from the clamping and driving part consisting of the capstan 22 and the pinch roller 21. The tape is not wound around the tape roll 13 but causes the arm 70 to turn in the counterclockwise direction in accordance with the length of the tape paid out. Therefore, the guide pole 23 pulls the tape 14 toward the left in FIG. 1, and the take-up side tape loop 14a is thereby formed.

At this time, a large braking force is being exerted by the brake band 107 acting on the upper disc of the supply reel disc 14. The tape 14 is not paid out from the tape roll 10. Accordingly, the tape 14 is clamped and driven by the capstan 22 and the pinch roller 21. The tension arm 90 is forced to turn in the counterclockise direction against the force of the torsion spring 102, independently of the arm 99, whereby the supply side tape loop 14b is contracted. As the tape loop 14b contracts, a length of the magnetic tape 14 corresponding to the contraction of this tape loop travels while contacting the guide drum (not shown) and the control head 20.

When the tape travels according to the contraction of the supply side tape loop 14b, the audio control head 20 reproduces the control signals which were recorded on the tape 14, slightly before the above described pause mode manipulation. In accordance with a control signal thus reproduced, the apparatus carries out a capstan-servo operation wherein the rotation of the capstan 22 is controlled. The phase of the control signals on the magnetic tape comes into contact with the rotary video heads (not shown). As the tape travels through a length corresponding to that of the tape loop 14a, the capstan-servo assumes a locked state. The rotary video heads (not shown) scan the tape 14 in a specific state. Since the magnetic tape 14 is already traveling at the predetermined speed at the time when the capstan-servo operation starts, as described hereinbefore, only a relatively short length of tape is required to travel until the capstan-servo is locked. Accordingly, the take-up side tape loop 14a is not required to be a very large one.

At the moment when the arm 70 is turned in the counterclockwise direction, as has been described hereinbefore, and comes to a position slightly before the position indicated in FIG. 1, the micro-switch 84 is closed. Thereupon, the electrical circuit system of the apparatus is placed in the recording mode. The capstan 22 resumes the original condition of rotating at the specific constant speed. Furthermore, a very short length of the tape clamped between and driven by the pinch roller 21 and the capstan 22 is wound by the tape roll 11 on the take-up side. After the micro-switch 85 is opened at the time of the aforementioned pause mode manipulation, the position of the magnetic tape 14 comes into contact with the erasing head, where it (the tape) wrappingly contacts the control head 20, and the guide drum (not shown). The tape comes into coincidence with the aforementioned position at the moment when the recording operation was stopped and when the tape loop 14a on the take-up side, assumes a state slightly before complete formation thereof, i.e., when the arm 70 rotates to the above mentioned position, the micro-switch 84 is closed.

Specifically, when the micro-switch 84 is to be closed, the capstan-servo is locked. All heads come into contact with the tape at the position which is the same as that of the tape at the moment when the recording operation stopped.

Furthermore, the spring 101 urges the tension arm 90 to turn in the clockwise direction as in the case of the normal tape traveling mode. The tension-servo operation is carried out by the brake band 107 and the tension pole 17 cooperating with each other. In this condition, the capstan 22 and the pinch roller 21 start to draw the magnetic tape 14 from the tape supply roll 10. On one hand, the brake arm 80 is engaged by the loop arm 90 and turned in the counterclockwise direction. The take-up reel disc 13 is released from the braking force imparted by the brake shoe 83. The tape roll 11 thereby starts to rotate in the tape take-up direction.

As a result of the closure of micro-switch 84, the electrical circuit is changed to the recording mode. Thereupon, the video signals are recorded by the rotary video heads (not shown), and the control signals by the control head 20, on the magnetic tape 14. Here, the phase of the control signals to be newly recorded on the tape 14, coincides with the phase of the control signals which have been previously recorded. Therefore, the control signals are recorded successively without any discontinuity, at a position where the prior and new video signals are recorded.

The rotary video heads (not shown) start to record new video signals from the extremity of the prerecorded part on the tape 14. Recording occurs in a manner wherein the rotational phase thereof coincides with that in the preceding recording mode. Accordingly, in the part where the new video signals have been recorded, the position where the vertical synchronizing signals are recorded comes into coincidence with the position where the vertical signals were recorded in the pre-recorded part of the magnetic tape 14. Consequently, on reproduction of the tape, on which the editing recording is carried, the reproduction is carried out without producing any phase disturbance at the positions where the editing recording is carried out.

The closure of the micro-switch 84 causes the capstan 22 to rotate again, the specific speed, under the control of the power source frequency and the like, as in the case of the above described recording and pause modes.

The change in the tension of the magnetic tape 14 at the moment when the tape starts its normal travel, i.e., when the editing recording starts, will be described.

While the tape 14 travels in the tape path as described hereinbefore, the tension arm 90 is caused to turn in the counterclockwise direction, counter to the torque of the torsion spring 102. The torque imparted to the tension arm 90, in the clockwise direction, increases as it turns toward the position indicated by the full line in FIG. 1. Accordingly, the tape tension Ta increases as the supply side tape loop 14b contracts or becomes smaller. The tension is detected by the tension pole 17. The tension assumes a value approximately equal to the tape tensions T1 and T2, at the time of normal tape traveling, when the tape loop 14b substantially disappears.

For this reason, the tension arm 90 is returned to the original position indicated in FIG. 1. The magnetic tape 14 starts to be drawn out from the tape supply roll 10 under tension control. The tension acting on the magnetic tape 14 becomes equal to the values T1 and T2 at the time of normal tape travel, without being accompanied by a large fluctuation.

Consequently, in the above described editing recording operation, the magnetic tape 14 is shifted within the tape path without rotation of the take-up tape roll and the supply tape roll. The length of the tape shifted is maintained constant without deviation from operation to operation. The fluctuation in tension is held to a minimum at the time when the editing recording starts.

For the former reason, the video signals of new program content are recorded with the control signals in coincidence phase with the pre-recorded control signals. Furthermore, for the latter reason, the invention avoids undesirable occurrences such as fluctuations in the rotation of the rotary video heads (not shown) and the capstan 22 due to fluctuations in the load, unlocking the servo system for the rotary video heads, and disturbance of the constant rotation of the capstan 22.

Furthermore, by merely shifting the position of the micro-switch 84, the apparatus can be so set to control the recording track of a new video signal. The new track can start without being formed continguously over the terminal position of the previously recorded track. It avoids recording in a manner which superimposes several tracks over the previously recorded tracks, or which leaves in a non-recorded part where tracks come together at their terminal ends. Even in these cases, the control signals are recorded on the tape 14 uniformly at the positions where the programs change, when the editing recording is carried out. For this reason, in the reproducing mode, the above described tape 14 does not have any undesirable effects which generate noise in the picture signal due to an unlocking of the servo at each change in program. The only uniformly slight noise which might occur is in the parts where the recording is superimposed or due to the non-recorded part generated. This slight noise is generated over only a few fields in the reproduced screen and is not unpleasant or uncomfortable to the viewer.

The above described embodiment of the invention relates to the open-reel type of recording apparatus. However, the present invention can, also be adapted, in the same manner, to apparatuses of the cassette type, wherein the tape is automatically drawn from a housing and wrapped around the guide drum over a specific angle.

In the above recording mode, the tension arm 90 is allowed, to turn in the clockwise direction, without being restricted in turning, independently of the arm 99. Accordingly, even if an excessive amount of magnetic tape is paid out from the tape roll 10 the arm 90 turns in the clockwise direction responsive to the torsion spring. The excessive pay out may occur as a result, for instance, of slight adherence of the tape to the rotary drum (not shown) rotating at a high speed. The arm 90 turns interrelatedly with the decrease in tape tension at the tension pole 17. Consequently, any slackening of the magnetic tape 14 is absorbed to form the tape loop which is guided by the guide pole 16, tension pole 17, and the guide pin 123.

The tension servo-mechanism operates in relation with the contraction of the tape loop due to the succeeding travel of the tape. Fluctuations in the tension of the magnetic tape 14 are kept small during editing recording operation.

Next, another embodiment of the tape shifting mechanism will be described with reference to FIGS. 7 and 8. This mechanism of the present embodiment is applied to a recording apparatus wherein there is a large sliding friction resistance between the magnetic tape 14 and the guide members. These members define the tape travel path. Sometimes, the friction is so large that the shifting toward the tape supply side cannot be carried out responsive to the force of the torsion spring 102.

Figure 7:
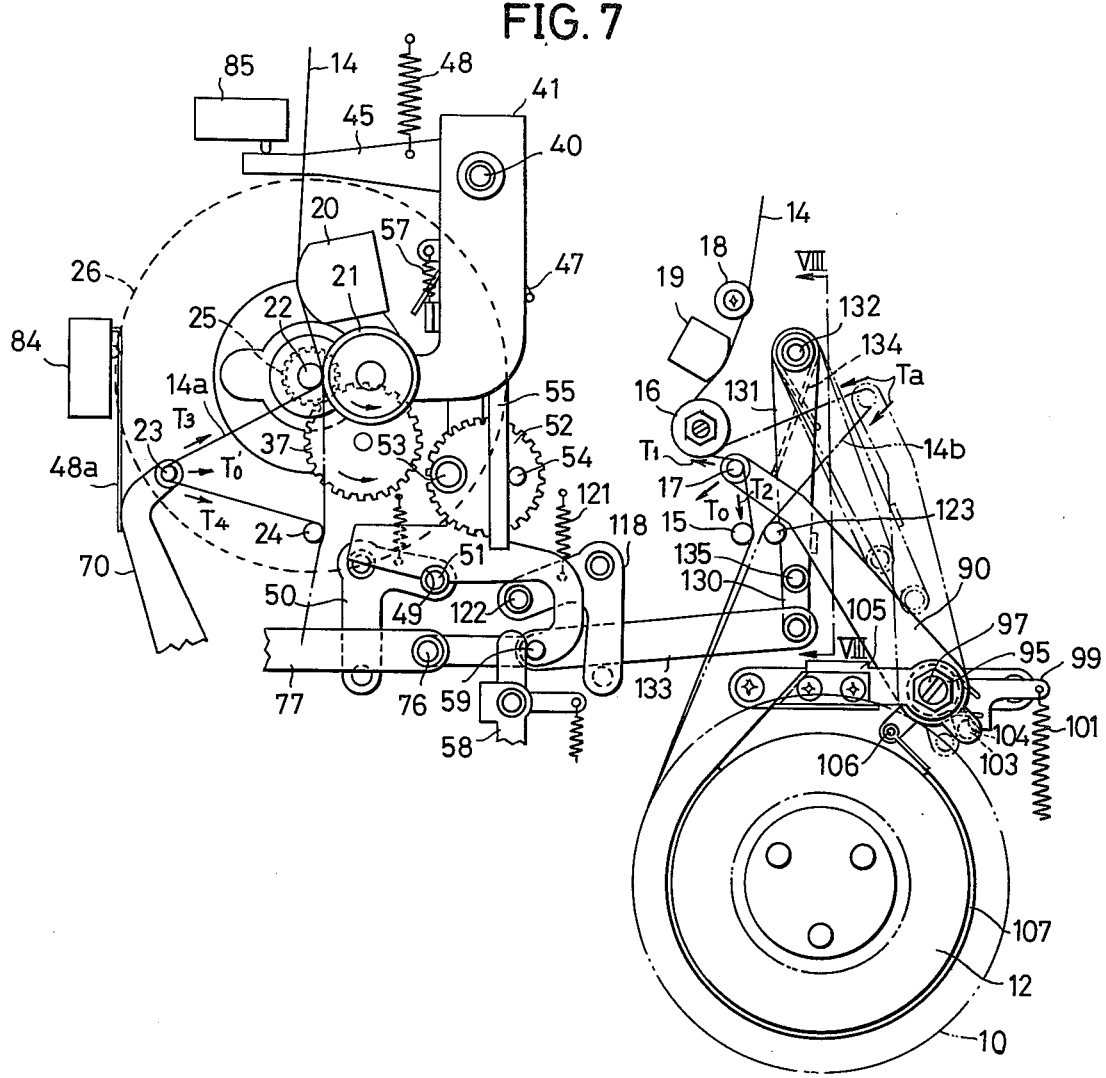
FIG. 7 is a partial plan view showing another embodiment of the tape recording apparatus capable of editing recording, according to the invention in its state of recording mode.

In the mechanism indicated in FIGS. 7 and 8, those parts which are the same as those in the apparatus illustrated in FIGS. 1 through 6 are designated by like reference numerals. A detailed description thereof will not be repeated.

An arm 130 and operational arm 131 are respectively supported on a stud 132, which extends through bushings. The arms are rotatable independently of each other. The arm 130 is connected at its distant end to the arm 45, by way of a connecting lever 133. A pair of arms 130 and 131 are urged respectively in the clockwise and counterclockwise directions by a torsion spring 134 wrapped around the stud 132. These arms are limited in their turning by being superimposed as indicated in FIG. 1. A pin 135, fixed to the distant end of the arm 131, engages and disengages the tension arm 90.

As the arm 45 is turned in the counterclockwise direction, as described hereinbefore, interrelatedly with the pause manipulation for editing, the arms 130 and 131 are turned unitarily in the counterclockwise direction by way of the connecting lever 133. The pin 135 now abuts against the arm 90. The arm 130 is further turned, independently of the arm 131 which has been limited in thus turning. The spring force of the torsion spring 134 is increased. The arm 131 is then turned in the counterclockwise direction, following the arm 130, by the spring force of the spring 134. The arm 90 is forced to turn in the clockwise direction, being engaged by the pin 135. Accordingly, the magnetic tape 14 is drawn out toward the right in FIG. 7 by the tension pole 17 in contact therewith to form the tape loop 14b. Interrelated with the formation of this tape loop 14b, the tape loop 14b contracts. The length of tape 14 which corresponds to the length of the tape loop 14a is moved toward the supply side.

The recording mode manipulation causes the arms 130 and 131 to turn, following the turning of the arm 45, in the clockwise direction to the original positions thereof. As the magnetic tape 14 travels forward, the arm 90 is gradually turned in the counterclockwise direction from a position indicated by a two-dot chain line. The tape loop 14b contracts and eventually disappears.

In the case of incorporating such a specific tape shifting mechanism, the supply side tension servo-mechanism will have a simple construction in which a spring and a brake band are secured directly to the tension arm.

Further, this invention is not limited to these embodiments but various variations and modifications may be made without departing from the scope and spirit of the invention.

What is claimed is:

1. A tape recording apparatus comprising:
means for transporting a recording tape from a first tape roll over a specific tape travel path to be taken up on a seocnd tape roll;
recodng and reproducing means disposed in a specific position along said tape travel path for recording signals on and reproducing signals from said tape;
means for varying the length of tape in a first part of the tape travel path extending from said recording and reproducing means to said second tape roll, said variation being between a maximum and a minimum tape length;
control mans for controlling said tape length varying means in a manner such that the length of said tape in said first part becomes a maximum during ordinary recording, a minimum during a pause mode preceding an editing recording, and the maximum during said editing;
reversing means for reversing the length of tape to be equal to the difference between said maximum and minimum lengths during said pause, said reversing means acting on a second part of the tape travel path extending from said first tape roll to said recording and reproducing means;
driving means operating during said ordinary recording to drive said tape paid out from said first tape roll and operating during said editing after said pause to drive tape in the second part of the tape travel path, which said second part includes both the tape which was reversed by said reversing means and the tape from said first tape roll contiguous thereto; and
detecting means operating during said editing recording to detect the operational condition wherein the tape portion reversed by said reversing means is driven in traveling motion, and said tape length varying means has assumed substantially a maximum tape length and means responsive to said detecting means for causing edit recording to start.

2. A tape recording apparatus as claimed in claim 1 in which said reversing means comprises a second member for engaging and guiding said tape in said second part of the tape travel path, and means for moving said second guiding member responsive to fluctuations in tape tension in said second part of the tape travel path during ordinary recording and reproducing modes and responsive to the length of said tape in excess of the movement of said second guide member to cause fluctuations of said tape tension during the pause.

3. A tape recording apparatus as claimed in claim 1 in which said control means includes means responsive to said driving means during the pause for causing said varying means to vary said length of the tape to said minimum, at a specific speed.

4. A tape recording apparatus as claimed in claim 1 in wichh said detecting means comprises first and second micro-switches mutually connected in series in an electrical circuit, means for switching said circuit to a reproducing mode responsive to an opening of at least one of said micro-switches, and to recording mode responsive to a closing of both micro-switches, means for operating said first micro-switch before opening said second switch, with said first switch operation being interrelated with the start of the operation of said tape length varying means to vary the tape length from said maximum to said minimum, said operation of said first switch placing said electrical circuit in a reproducing mode, means for operating said second micro-switch after the closure of said first micro-switch responsive to completion of the operation of said tape length varying means to vary the tape length from said minimum to said maximum, said operation of said second switch placing said electrical circuit in an editing recording mode.

5. A tape recording apparatus as claimed in claim 1 in which said tape length varying means comprises a first member for engaging and guiding the tape in said first part of the tape travel path, and displacement means for moving said first tape guiding member, said displacement means varying the length of travel path in said first part of the tape travel path by moving said first tape guiding member.

6. A tape recording apparatus as claimed in claim 5 in which said detecting means comprises a micro-switch operated and released responsive to said movement of said displacement means, and means responsive to the switching of said micro-switch for selecting between operational modes of an electrical circuit.

7. A tape recording aparatus as claimed in claim 1 in which said reversing means comprises means for varying the length of tape in said second part of the tape travel path in inverse proportion to the change in tape length in said first part of the tape travel path.

8. A tape recording apparatus as claimed in claim 7, which further comprises braking means for braking said first and second tape rolls to prevent rotation thereof during said pause, and means for operating said varying means so that the variation of the tape lengths in said first and second parts of the tape travel path portions are interrelated so that the total length of the entire tape path remains unchanged.

* * * * *